(12) United States Patent
Moberg

(10) Patent No.: US 6,290,163 B1
(45) Date of Patent: Sep. 18, 2001

(54) DEVICE FOR PICKING UP COVERING FABRICS FROM PLANTATION FIELDS

(75) Inventor: Jan Moberg, Krokom (SE)

(73) Assignee: Frösö Trädgård AB, Krokom (SE)

( * ) Notice: Subject to any disclaimer, the term of this patent is extended or adjusted under 35 U.S.C. 154(b) by 0 days.

(21) Appl. No.: 09/424,842

(22) PCT Filed: May 29, 1998

(86) PCT No.: PCT/SE98/01022

§ 371 Date: Dec. 6, 1999

§ 102(e) Date: Dec. 6, 1999

(87) PCT Pub. No.: WO98/56235

PCT Pub. Date: Dec. 17, 1998

(30) Foreign Application Priority Data

Jun. 10, 1997 (SE) .................................................. 9702209

(51) Int. Cl.[7] ........................................................... B65H 18/08
(52) U.S. Cl. ............................ 242/471; 242/397.3; 242/403
(58) Field of Search ................................... 242/918, 919, 242/471, 397.3, 403, 397.1

(56) References Cited

U.S. PATENT DOCUMENTS

| 2,501,390 | * | 3/1950 | Jeffreys | 242/403 |
|---|---|---|---|---|
| 2,704,191 | * | 3/1955 | Schley et al. | 242/403 |
| 2,828,089 | * | 3/1958 | Isenberger | 242/403 |
| 3,531,059 | * | 9/1970 | Walker | 242/397.3 |
| 3,753,409 | * | 8/1973 | Frazier | 242/397.3 |
| 3,863,859 | * | 2/1975 | Keith | 242/403 |
| 4,148,445 | * | 4/1979 | Reynolds et al. | 242/397.1 |
| 4,767,073 | * | 8/1988 | Malzacher | 242/403 |
| 4,802,636 | * | 2/1989 | Frick et al. | 242/471 |
| 4,871,127 | * | 10/1989 | Clark | 242/403 |
| 5,246,181 | * | 9/1993 | Straub et al. | 242/403 |
| 6,007,016 | * | 12/1999 | Helton | 242/471 |

FOREIGN PATENT DOCUMENTS

| 2091686 | * | 8/1982 | (GB) | 242/403 |
|---|---|---|---|---|
| 2239154A | | 6/1991 | (GB) . | |

* cited by examiner

Primary Examiner—Emmanuel M. Marcelo
(74) Attorney, Agent, or Firm—Birch, Stewart, Kolasch & Birch, LLP

(57) ABSTRACT

A device is provided for picking up fabrics from plantation fields which comprises a frontally mounted capturing device (9), through which a spread-out fabric (8) may be pulled in while forming a narrow strand. A rotatable shaft (11) is axially placed on the vehicle in order to be able to receive a reel (10). Between the capturing device (9) and the reel (10), there are hollow cylinders (14,14',14") for guiding the strand of fabric in a gathered state to the reel (10). In the proximity of the reel, there is also an oscillating arm (12) for evenly distributing the strand of fabric onto the reel.

8 Claims, 4 Drawing Sheets

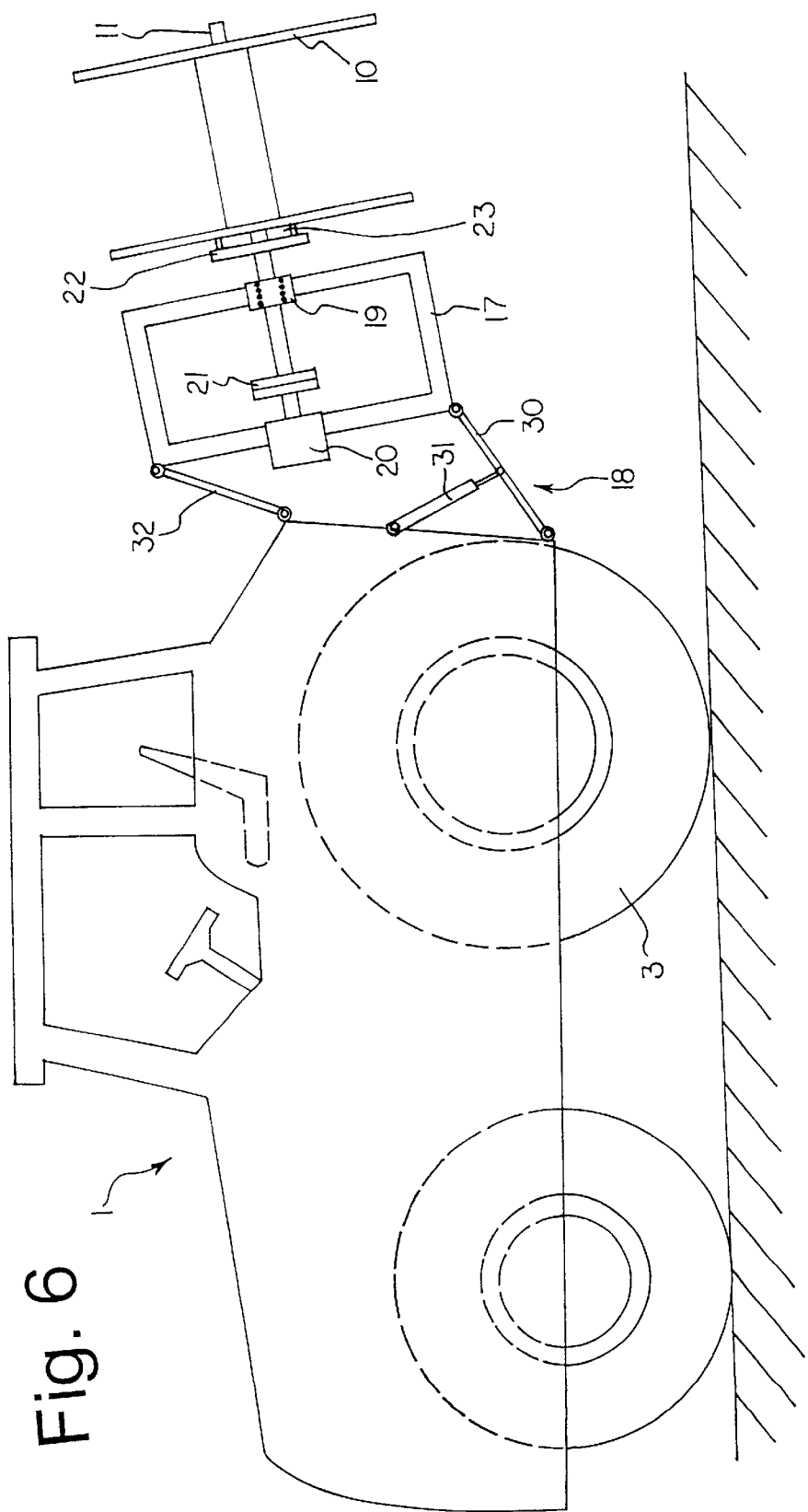

DEVICE FOR PICKING UP COVERING FABRICS FROM PLANTATION FIELDS

TECHNICAL FIELD OF THE INVENTION

Figure 1:
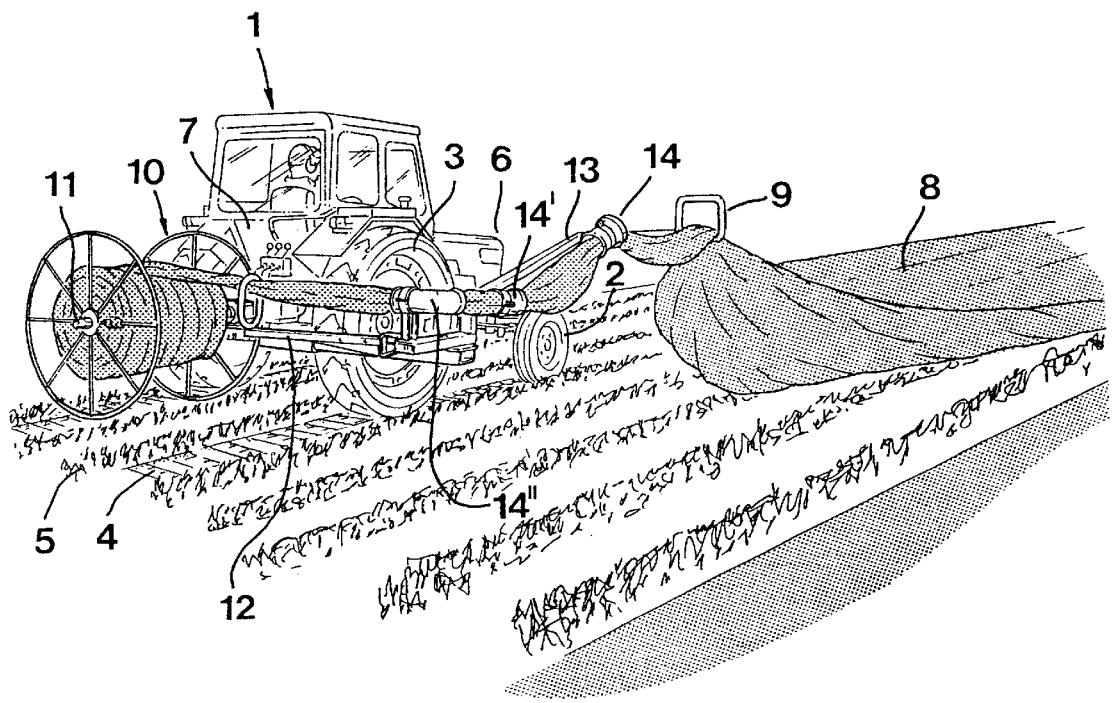

This invention relates to a device intended for picking up covering fabrics from plantation fields, comprising a shaft mountable on a wheel-borne vehicle, which shaft is rotatable with the purpose of guaranteeing winding the fabric into a roll.

PRIOR ART

Recently, it has become usual to cover outdoor cultivations with fabrics with the purpose of ensuring a good heat generation in the immediate proximity to the crops, as well as protecting the crops against insect or bug attacks. The improved heat generation yields early and safe harvests and by the fact that insects are kept away from the crops, the use of chemical insect control means may be made unnecessary. For the last-mentioned reason, the covering fabrics are used with a particular advantage in ecological cultivations. The fabrics may consist of a fibrous fabric or a perforated plastic film, which in both cases is delivered in long lengths having a large width. In practice, these fabrics usually have a width within the range of 10–13 meters and a length of 150–250 meters or more. At delivery, the fabrics are folded and wound into rolls the width of which may attain approx. 2 meters. To put out such fabrics on the plantation field is comparatively simple, but problems arise when the fabrics are to be taken in from the field towards the end of the cultivation season so as to be reused during a following cultivation season. Most often, the handling is done manually, more precisely by several men successively pulling out smaller portions of the fabric, after loosening existing anchorages, to one edge of the plantation field and there fold and pack said fabric together step by step along the entire length thereof. This procedure is not only laborious and time-consuming but also associated with high risks of sensitive crop being damaged. With the purpose of removing the need for the difficult manual handling of fabrics, simpler machine equipments have been developed for partly mechanized picking up the fabrics. More precisely, these equipments consist of rotatable shafts which are drivable by means of, for instance, the ordinary hydraulic system of a tractor and which are included in a stand mountable on the rear of the tractor. However, such shafts merely permit a partial facilitation of the work inasmuch as the fabric may be wound to itself and be transported away from the field only when it still has been folded together manually to a limited width (approx. 2 meters) which corresponds to the length of the shaft. In other words, this mechanized method still requires manual folding of the fabric before winding it onto the shaft.

OBJECTS AN FEATURES OF THE INVENTION

The present invention aims at obviating the above-mentioned problems and at creating a device for picking up fabrics which radically decreases the need for manual work in conjunction with the removal of covering fabrics from plantation fields, as well as reduces the risks for damages to the crops as well as the fabrics to a minimum. Thus, a primary objection of the invention is to provide a device for picking up fabrics which permits that the fabric in the existing, spread out state is taken up directly from the field and taken care of in an immediately storable form without having to be handled by many people. A further object of the invention is to create a picking up device permitting a simple, fast and effective picking up work by one single man, viz., a driver of a tractor or a similar vehicle. In doing so, the driver should be able to deliver the fabric modified to a storable shape without having to leave the vehicle. It is also an object of the invention to create a picking up device permitting picking up covering fabrics independent of the current weather, in particular with regard to wind-force and precipitation conditions.

According to the invention, at least the primary object is attained by a device for picking up a spread out sheet of fabric from a farm field, comprising a shaft which may be mounted on a tractor or the like, with the shaft being rotatable for winding the fabric onto a roll. The apparatus includes an elongate arm which may be mounted to extend from the front of the vehicle, and which has a fabric capturing device such as a loop at its front end. The fabric may be drawn through the loop thereby forming a narrow strand. The rotatable shaft is axially mounted to the vehicle, to received as well as liberate a separate reel for winding the bunched up fabric by driving the vehicle in a direction backwards or forwards. Between the capturing device and the shaft are placed one or more members for guiding the fabric strand in its gathered state from the capturing drive to the reel. These members include a passageway for the fabric which is restricted in size relative to the capturing device, for bunching the fabric into a comparatively narrow strand. A mechanism is arranged in proximity to the shaft to evenly distribute the arriving strand of fabric onto the reel. Preferred embodiments of the device for picking up fabrics according to the invention include the capturing device consisting of an endless frame or ring. Further, the capturing device may be placed in front of the front wheels of the tractor or similar vehicle to which the registration arm is mounted.

In one particularly preferred embodiment, the separate reel comprises a central pipe for application onto the shaft, and includes two opposite gables on either end. The shaft is vertically tiltable and includes a dog having one or more fingers which automatically engage one of the gables when an end portion of the reel approaches an inner end position in proximity to the dog, as the shaft is tilted to a position pointing obliquely outwards and upwards. With this arrangement the reel may be released from the dog when the shaft is tilted to a position pointing obliquely outwards and downwards. The gables may consist of an external ring and a plurality of spokes.

In a further aspect, the guiding means may consist of one or more pipe pieces e.g., hollow members such as hollow cylindrical members, which are somewhat elongate. Preferably at least one of these pipe pieces includes an elbow for guiding a strand of fabric from a motion path which is axial to the direction of travel of the tractor, to one which is transverse to this direction for winding up on the reel. Preferably, the apparatus includes mounting means in which the shaft and reel are at the rear of the vehicle. The fabric guiding means and distribution mechanism are mounted on the framework along one side of the vehicle and projecting laterally from the vehicle.

BRIEF DESCRIPTION OF THE APPENDED DRAWINGS

Figure 2:
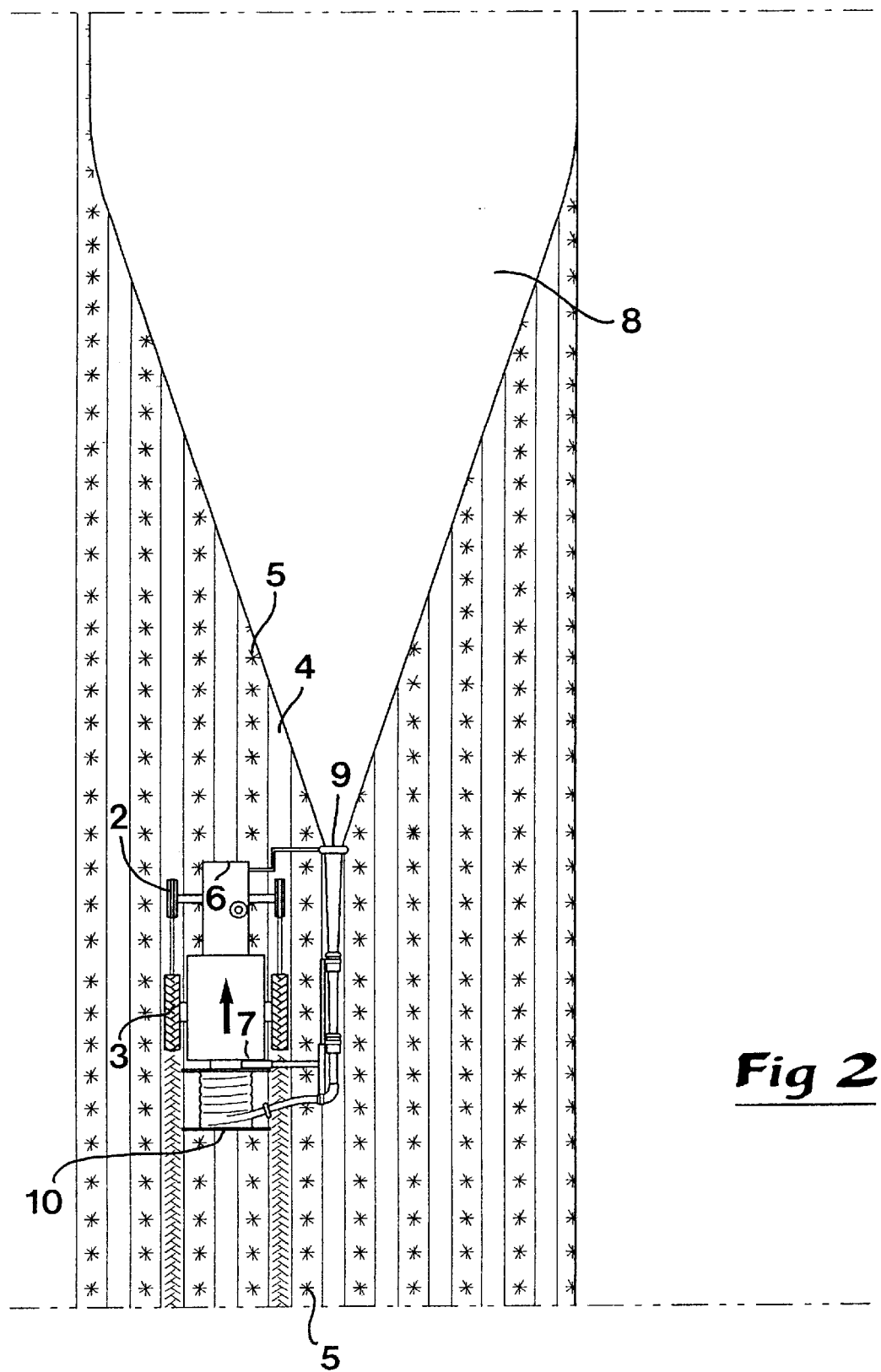
Figure 3:
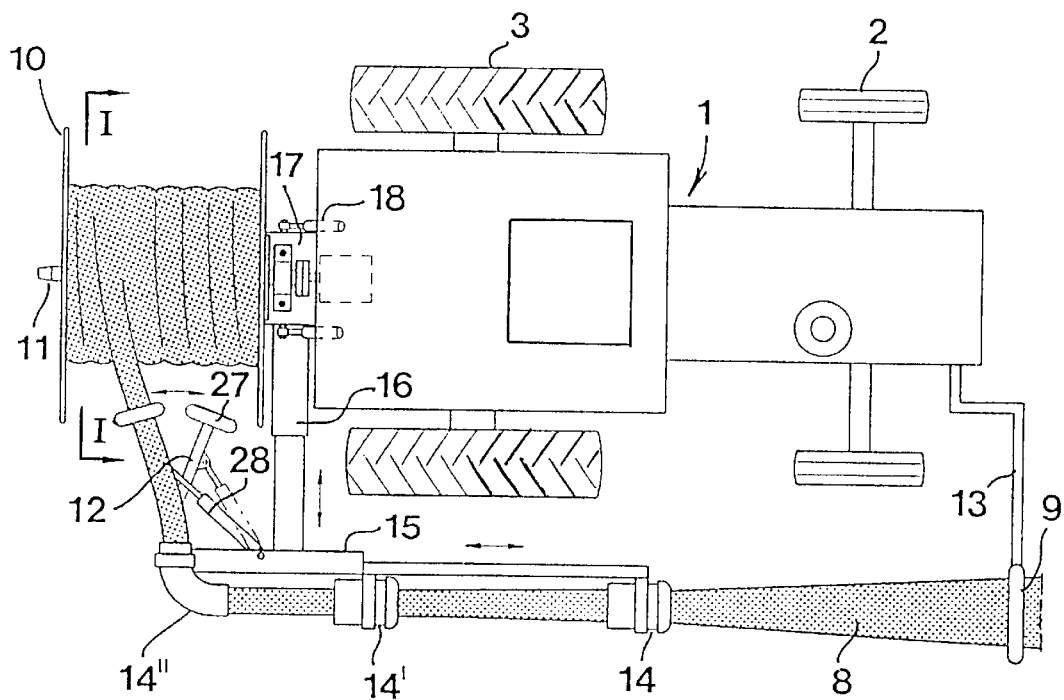
Figure 4:
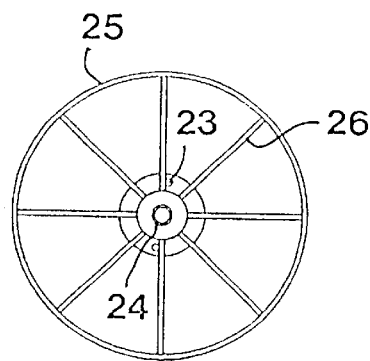
Figure 5:
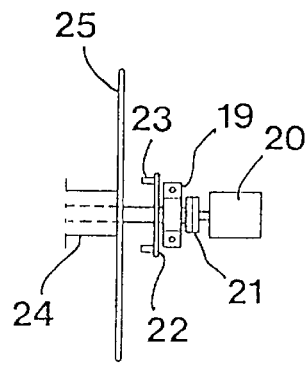

In the drawings:

FIG. 1 is a perspective view of a device according to the invention mounted on a tractor during work, FIG. 2 is a planar view from above of the tractor working in a plantation field together with the device, FIG. 3 is an enlarged planar view from above showing the device more in detail, FIG. 4 is a section I—I in FIG. 3, although without the wound fabric, and FIG. 5 is a partial view from above showing a dog for rotation of a reel for picking up fabrics.

FIG. 6 is a side elevational view of the present invention, as shown as mounted to a tractor.

DETAILED DESCRIPTION OF A PREFERRED EMBODIMENT OF THE INVENTION

In the drawings (see initially FIGS. 1 and 2), 1 generally designates a vehicle in the form of a tractor which, in a conventional way, may include a frontal wheel pair relatively small wheels 2, as well as a rear wheel pair having considerably larger wheels 3. Advantageously, these wheels are possible to reset so that they may be adjusted to various distances between the plant rows. In other words, the wheels of the tractor should be able to be brought forward in furrows 4 between adjacent plant rows 5. In the drawings, 6 designates a frontal end of the tractor, while a rear end is generally designated 7. A covering fabric for protecting the crops growing on the plantation field is in turn generally designated 8.

For the continued description reference is now also made to FIGS. 3 to 5. A picking up device made according to the invention is mounted on tractor 1, the main components of which device consist of a capturing device 9, a reel 10 which is mountable on a rotatable shaft 11, and means for guiding a part of the fabric shaped to a strand by the capturing device 9 from the capturing device to the reel 10. Furthermore, a mechanism 12, which has the purpose of evenly distributing the held together fabric strand on the reel 10, is included in the device.

In the example shown the capturing device 9 consists of an endless frame or ring which is applied on an registration arm in the shape of a bar 13 which projects from one side of the tractor. More precisely, the frame 9 is placed in front of the front wheels of the tractor, with the frame situated comparatively highly above the ground (e.g. within the range of 1–2 meters). This placing guarantees that the fabric 8 may be removed from the crops in a careful way by being lifted up in a comparatively steep angle against the ground-level as well as that the strand-shaped, gathered part of the fabric which follows after the capturing device does not get stuck in the wheels of the tractor even if hard wind would occur.

The gathered strand of fabrics is led from the capturing device 9 via a number of pipe pieces 14, 14', 14" of which the two first-mentioned ones have the shape of straight pipes with a considerable length extension. The last-mentioned pipe piece consists of a pipe bend by means of which the strand of fabric may be unlinked from the motion path parallel to the length extension of the vehicle to a transverse motion path in direction towards the reel 10. In the present example, the reel 10 is mounted at the rear of the tractor. In doing so, the guiding pipes 14, 14', 14" are mounted on a framework 15, which extends along one side of the tractor, and they are carried by a laterally projecting carrier 16.

The shaft 11 is carried by a fastener 17 (see FIG. 3), which is turnably moveable relatively the framing of the tractor. More precisely, the fastener 17 may be turned in the vertical plane by means of the three-point lift 18 of the tractor. By means of this three-point lift, the shaft 11 may thus be tilted between various oblique positions, more precisely between an upper end position in which the shaft points obliquely outwards/upwards relatively the horizontal plane and a lower end position in which it points obliquely downwards, backwards relative to the horizontal plane. The shaft 11 is rotatably mounted in a bearing device 19 (see FIG. 5) applied on the fastener 17, and drivable by means of a hydraulic motor 20 connected to the ordinary power outlet of the tractor. Between the motor and the bearing device a sliding clutch 21 may be arranged. On the shaft, there is a dog in the shape of a disk 22 having one or more fingers 23.

The reel 10 includes, in addition to a central pipe 24 for application onto the shaft 11, two opposite end portions, each one of which consists of an external ring 25 and a plurality of spokes 26 which extend radially between the ring and the pipe. The reel constructed in this way is in practice easy to handle, inasmuch as the application as well as the removal can be carried out by means of levers inside the driving compartment. Thus, the shaft 11 may be tilted to a substantially horizontally or obliquely downwards/backwards leaning position in which it may be inserted into the pipe 24 of a reel laying on the ground. When the shaft is thereafter tilted up to an obliquely upwards/backwards leaning position, the reel pipe automatically slides forwards so that the fingers 23 on the dog 22 will stick into the spaces between adjacent spokes. This means that the dog automatically connects the motor's drift to the reel so that this is brought to rotate when the shaft is rotated by means of the motor. When the reel has been filled with fabrics the reel may be removed from the shaft merely the simple measure of tilting the shaft to an obliquely backwards/downwards leaning position in which the reel automatically slides off the shaft.

The distribution mechanism 12 has in the shown example the shape of an arm which at a first end is articulatedly connected to the frame 15 in order to be pivotable backwards and forwards, and which at the opposite end thereof has a loop 27 through which the strand of fabrics may pass. Instead of a loop, other means may also be used, e.g. an upwardly open U-bolt. Pivoting of the arm 12 is guaranteed by means of a hydraulic cylinder 28, which by being shortened and lengthened in a steady pace, brings the arm to sway backwards and forwards along the length extension of the reel in a corresponding pace.

FIG. 6 illustrates the picking up device mounted to a conventional tractor 1. The tractor 1 includes a conventional three point lift 18 which includes pivot-mounted lower and upper support arms 30 and 32. It will be seen that arms 30 and 32 diverge outwardly and rearwardly, in order to effect a rearward tilting of an object carried by the arms as the lower arm is drawn upwardly by hydraulic cylinder 31. The arms 30 and 32 carry the fastener 17, which comprises a frame for supporting the motor 20 and shaft 11. In a conventional manner, shaft 11 is journalled within bearing device 19. In the orientation shown in FIG. 6, the shaft 11 tilts upwardly and rearwardly, thus permitting the reel 10 to engage fingers 23 of the dog 22. Disengagement occurs when the gathering device is lowered and tilted downwardly and rearwardly, thus permitting the reel 10 to slide away from the dog 22.

FUNCTION AND ADVANTAGES OF THE INVENTION

When a covering fabric, spread-out on a plantation field, is to be removed, the preparatory measure is taken that the existing anchorages are at least partly removed from the long side edges of the fabric. In addition, a 5–10 meters long cord may advantageously be fastened at one end of the fabric. This cord may in a simple way be pulled through the capturing device 9, the various pipe pieces 14, 14', 14", the loop 27 on the pivoting arm 12, and wound some rounds around the central pipe 24 of a reel applied on the shaft 11. The application of the reel onto the shaft is carried out in the simple way previous described, i.e. by initially tilting the shaft to a lower position in which it may be inserted into the direction upwards, the reel automatically sliding to an inner end position in which the dog is automatically engaged with the spokes of the inner end portion. Picking up the fabric is initiated by setting the reel in rotation simultaneously as the tractor is driven in the forward direction, more precisely with the wheels of the tractor positioned in the furrows between adjacent plant rows. When the cord attached to one end of the fabric has in its entity passed the capturing device 9, the fabric too is pulled through the device, whereby the 10–13 meters wide fabric is gathered and shaped to a comparatively narrow strand. This strand then passes through the guiding pipe pieces as well as the loop of the distribution arm, and then the same is wound to the reel while forming a roll. By the fact that the guiding pipe pieces are of a considerable length, it is guaranteed that the strand of the fabric is smoothly guided through the same without fluttering and getting itself entangled therein. In addition, the distribution arm guarantees that the arriving strand of fabric is evenly distributed in the roll which is built up on the reel.

A substantial advantage of the device according to the invention is that the fabric is taken up from the spread-out state thereof on the plantation field without initially having to be folded. By the fact that the capturing device is placed relatively high above the ground-level and in front of the front wheels of the tractor, it is furthermore guaranteed that the fabric will be removed from the ground-level in a comparatively large or steep angle. This means that the risk for damage on the crops is minimized. Simultaneously, the steep angle guarantees that the fabric will not be damaged as well as be kept clean by the fact that soil and stones may roll along the fabric all the way to the free end, which is finally captured and wound onto the reel. Furthermore, it is avoided that the still spread-out part of the fabric does not get caught in the tractor wheels in conjunction with possible flutter motions as a consequence of wind. Another substantial advantage is that the roll of fabric wound onto the reel may be handled in a simple and timesaving way. Thus, the reel together with the fabric may in a simple way be encircled by a plastic bag or the like in order to protect the fabric against UV-light. Such a protective bag may be smoothly wrapped around the reel while it is still applied to the shaft 11, and then the reel may be transported by means of the tractor to a suitable storage yard.

When a new cultivation season is to be initiated, the used fabric wound to the reel may be laid out on the plantation field again in a smooth and timesaving way. Thus, the fabric may be pulled out from the reel in a strand shape through the loop 27 of the distribution arm 12, while this is kept inactive, and then the fabric is spread out over the field by two men following the tractor and separating the long side edges of the fabric as the tractor moves forwards along the plantation field.

FEASIBLE MODIFICATIONS OF THE INVENTION

The invention is not solely restricted to the embodiment described and shown in the drawings. Thus, it is feasible to mount the shaft of the reel at the front of the tractor instead of at the rear. However, also in this case the shaft is mounted axially in order to permit the simple and smooth attachment and detachment, respectively, of the reel. In case the shaft together with the reel is front-mounted, the number of guiding pipe pieces may be reduced, for instance to only one pipe bend. Also other modifications of the invention are possible within the scope of the attached claim 1.

What is claimed is:

1. Device for picking up covering a spread-out sheet of fabrics from plantation fields, comprising a shaft which is mountable on a wheel-borne vehicle, and rotatable with the purpose of winding the fabric into a roll, characterized in that the same comprises a capturing device (9), which is arranged on a registration arm (13) placeable at the front of the vehicle (1), and includes an opening through which a fabric (8) spread-out on a field may be pulled in while forming a narrow strand, that the rotatable shaft (11) is axially placed on the vehicle (1) in order to be able to receive as well as liberate a separate reel (10) intended for winding the strand-shaped fabric by driving the vehicle in the direction backwards or forwards, and that there are means (14, 14', 14") between the capturing device (9) and the shaft (11) for guiding the strand of the fabric in a gathered state from the capturing device to the reel (10), said means including a passageway for said fabric restricted in size relative to the opening of said capturing device for shaping said fabric into a comparatively narrow strand, a mechanism (12) being arranged in proximity of the shaft (11) to evenly distribute the arriving strand of fabric onto the reel.

2. Device according to claim 1, characterized in that the capturing device consists of an endless frame or ring (9).

3. Device according to claim 1, characterized in that the reel (10), in addition to a central pipe (24) for application onto the shaft (11), comprises two opposite gables on either end, and that the shaft (11) is vertically tiltable and comprises a dog (22) having one or several finger (23), which may automatically engage one of said gables when an end portion of the reel approaches an inner end position in proximity of the dog by the fact that the shaft is tilted to a position pointing obliquely outwards/upwards.

4. A device according to claim 3, wherein said gables each comprise a peripheral ring and a plurality of spokes joining said ring with said central pipe.

5. Device according to claim 1, characterized in that said guiding means consists of hollow members (14, 14', 14") having a marked length extension.

6. Device according to claim 5, characterized in that at least one of said hollow cylindrical members consists of an elbow (14") to guide the strand of fabric from a motion path parallel to the direction of pick-up of said fabric to a direction transverse to said direction of pick, for winding up of said fabric onto said reel.

7. Device according to claim 1, characterized in that the shaft (11) and the reel (10) are arranged to be placed at the rear of the vehicle (1), all fabric guiding means (14, 14', 14") together with the distribution mechanism (12) being mounted on a framework (15) arranged to be placed along one side of the vehicle, said framework being arranged on a carrier (16) for projecting laterally from the vehicle.

8. Device according to claim 7, characterized in that the distribution mechanism comprises an arm (12), which at a first end is articulatedly connected to the frame (15) in order to be pivotable backwards and forwards by drive means, and at a second end has means (27) for guiding the strand of fabric.

* * * * *